United States Patent [19]
Dolton

[11] 4,212,505
[45] Jul. 15, 1980

[54] BEARING ASSEMBLIES
[75] Inventor: Anthony D. Dolton, Maidenhead, England
[73] Assignee: Vandervell Products Limited, Maidenhead, England
[21] Appl. No.: 18,350
[22] Filed: Mar. 6, 1979

Related U.S. Application Data
[63] Continuation of Ser. No. 862,612, Dec. 20, 1977, abandoned.

[30] Foreign Application Priority Data
Dec. 21, 1976 [GB] United Kingdom ............ 53423/76

[51] Int. Cl.² .................... B61F 17/00; F16C 33/66
[52] U.S. Cl. .................... 308/79 A; 308/240
[58] Field of Search ............ 308/56, 79, 79.1, 81, 308/82, 83, 86, 95, 96, 126, 240, 133

[56] References Cited
U.S. PATENT DOCUMENTS

| | | | |
|---|---|---|---|
| 2,368,677 | 2/1945 | Pearce | 308/79.1 |
| 2,829,015 | 4/1958 | Holin | 308/79 |
| 2,946,630 | 7/1960 | Smith | 308/79 |
| 3,109,684 | 11/1963 | Tupper | 308/240 |
| 3,980,353 | 9/1976 | Hill | 308/79.1 |

FOREIGN PATENT DOCUMENTS
796943 6/1958 United Kingdom .

Primary Examiner—Richard R. Stearns
Attorney, Agent, or Firm—Mawhinney & Mawhinney & Connors

[57] ABSTRACT

A railway bearing housing has a cylindrical bore in which a cylindrical bearing liner is seated to receive a railway vehicle axle, at least one cavity being formed in the lower part of the housing and extending along the length of the housing to contain lubricant. The cavity communicates through an opening extending along the length of the housing bore with either a corresponding opening extending along the length of the bearing liner or with a number of spaced apertures in the bearing liner so that lubricant can flow through the cavity and the opening or apertures onto the rotating axle within the liner.

7 Claims, 3 Drawing Figures

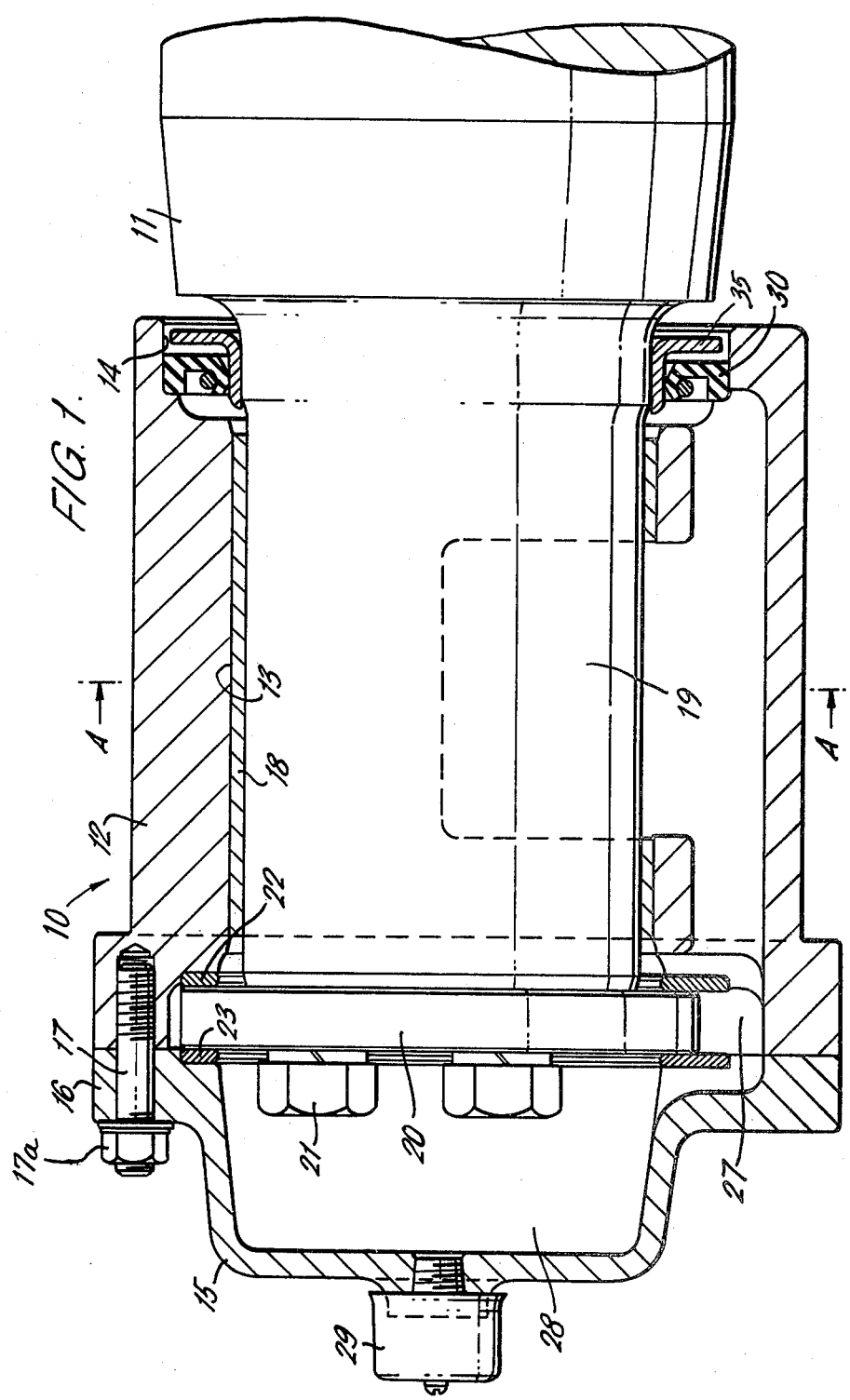

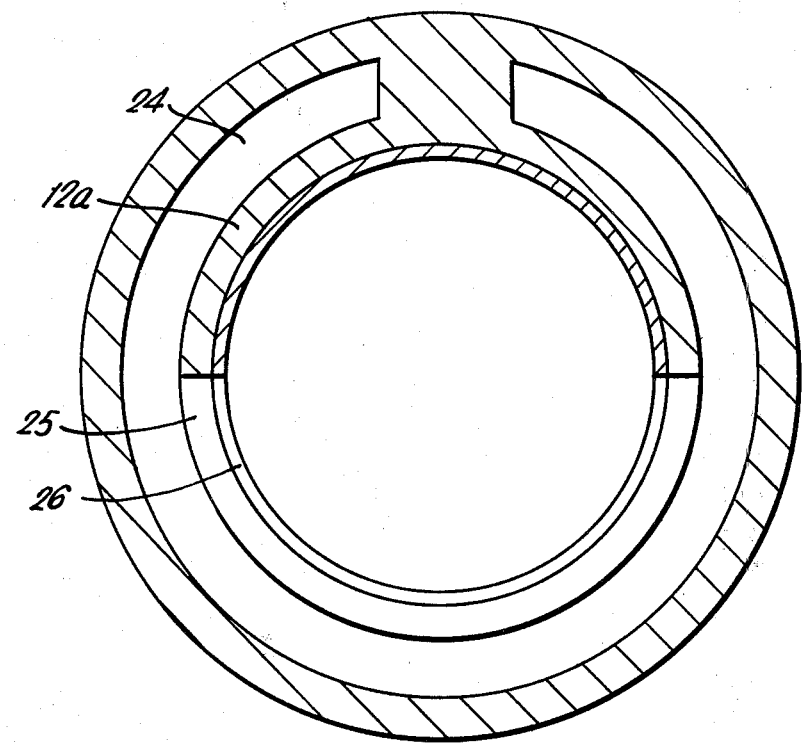

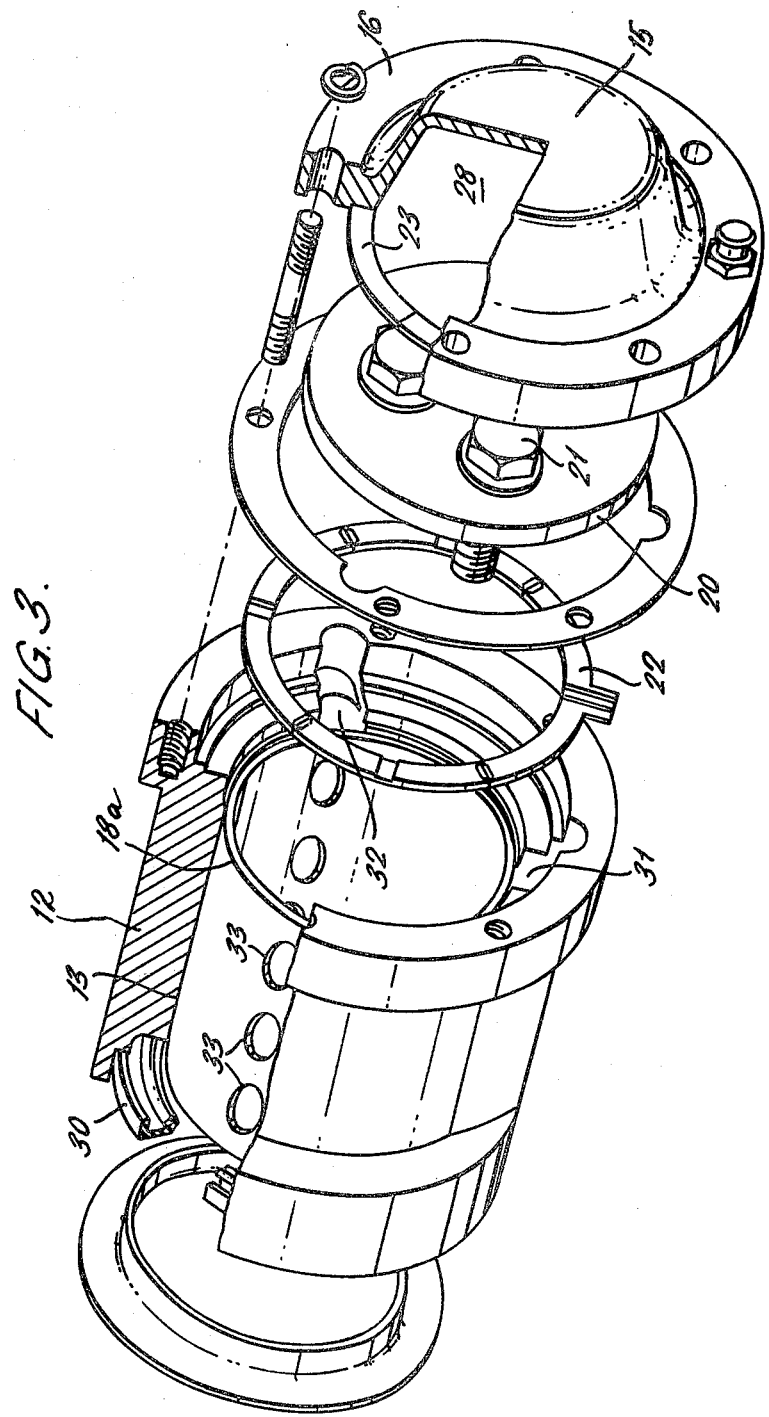

4,212,505

BEARING ASSEMBLIES

This is a continuation of applicant's co-pending patent application Ser. No. 862,612 filed Dec. 20, 1977, entitled RAILWAY BEARING IMPROVEMENTS, now abandoned.

BACKGROUND OF THE INVENTION

This invention relates to bearing assemblies and is particularly although not exclusively applicable to bearing assemblies for railway vehicles.

DESCRIPTION OF THE PRIOR ART

In the field of railway bearings it is known to provide a bearing block having a part cylindrical recess with an arcuate bearing liner mounted in the recess to face downwardly to receive the upper part of a railway vehicle axle. Lubrication for the axle is provided by means of a wick or other feed mechanism immersed in oil and engaging the under side of the axle so that as the axle rotates, a smearing of oil is constantly provided along the whole length of the axle journal. Examples of such bearings are described in U.S. Pat. Nos. 2,251,720, 2,368,677, 3,799,632 and 3,838,900.

In practice the feed arrangement of oil to the axle bearing has proved to be occasionally unreliable and it has a further disadvantage that the axle is not supported from below and so it could, in certain circumstances, bounce against its bearing the impact of which could cause severe damage to the bearing.

A further form of railway bearing is described in U.S. Pat. No. 3,980,353 having a cylindrical housing with a cylindrical bore in which a cylindrical bearing liner is seated to receive the axle. Lubrication is provided by way of a reservoir formed in an end cap at one end of the housing and a through-way leading from the lower end of the reservoir through the wall thickness of the housing to a port at the bottom of the bearing liner midway along the liner. In the latter arrangement, the axle is wholly constrained by the bearing and it is an object of the present invention to improve further the lubrication of the axle journal rotating within the liner, and, in particular, to ensure that the axle journal is lubricated along its entire length.

SUMMARY OF THE INVENTION

The invention provides a bearing assembly for supporting an axle for rotation comprising a housing having a cylindrical bore, a housing having an opening at one end of the bore to receive the axle and being closed at the other end of the bore, a cylindrical bearing liner seated in the bore to receive the axle, at least one opening extending along the lower part of the bore for holding a supply of lubricant and at least one slot or opening in the bearing liner in register with the opening in the bore and extending along the length thereof to enable lubricant to pass from the opening in the bore to an axle rotating within the liner.

BRIEF DESCRIPTION OF THE DRAWINGS

FIG. 1 is a sectional view through a bearing assembly according to the invention for a railway vehicle axle;
FIG. 2 is a section on the line A—A of FIG. 1; and
FIG. 3 is a perspective view, partly cut away, of an alternative arrangement.

DESCRIPTION OF THE PREFERRED EMBODIMENTS

The drawings show a bearing assembly 10 for a railway vehicle axle 11.

The assembly 10 comprises a generally cylindrical housing 12 having a bore 13 extending through the housing for the greater part of the length thereof. The housing has an open end 14 at one end of the bore and is closed at the other end by an end cap 15 which is cup-shaped and has a rim 16 through which studs 17 projecting from the housing 12 extend to receive nuts 17a which secure the cap 15 to the housing 12.

A cylindrical bearing liner 18 which may be formed in one or more parts is seated in the bore 13. The axle 11 has a reduced diameter end journal 19 which extends into the housing and is supported in the bearing liner 18 for rotation. At the end of the journal 19 there is a thrust collar 20 secured to the end of the axle by bolts 21. The thrust collar engages between one axially facing thrust flange 22 mounted on the housing 12 and one axially facing thrust flange 23 mounted on an oppositely facing part of the end cap 15 so that the axle is constrained against axial movement in the housing.

The housing 12 is formed with a reservoir 24 for a lubricant such as grease within the wall thickness of the housing, the reservoir extending around the greater part of the diameter of the housing but terminating short of the upper end of the housing as can be seen in FIG. 2. The resulting inner wall 12a of the housing is formed with a semi-circular opening 25 around the lower part thereof and the bearing liner 18 is formed with a similar semi-circular opening 26 located mid-way along the liner and in exact register with the opening 25. The lubricant reservoir 24 is in communication with a passage 27 at the bottom of the housing with the end cap 15 which provides a supplemental lubricant reservoir indicated at 28. At the center of the end cap there is a removable plug 29 through which the reservoir 28 can be charged with lubricant.

It will be understood that the rotating axle journal 19 is open to the lubricant in the reservoir 24 through the apertures 25 and 26 so that as the journal rotates in the liner 18, lubricant is smeared onto the journal and the resulting film of lubricant is drawn into the nip between the top of the journal and the bearing liner where hydro-dynamic pressure is generated in the oil film to support the journal against metal-to-metal contact with the liner.

At the open end 14 of the housing 10 there is a lip type oil seal 30 which engages an L-section annular ring 35 which is a press fit on the axle 11 to prevent loss of lubricant from the housing.

Referring now to FIG. 3 of the drawings there is shown a further embodiment of the invention in which the reservoir 24 is omitted from the housing and, instead, the bottom of the bore 13 of the housing has a deep opening 31 extending along the length of the bore from the end adjacent the end cap 15. Two further deep slot openings 32 extend along the length of the bore 13 and are disposed respectively 120 degrees around the bore on either side of the opening 31. All three slot openings 31 and 32 are in communication with the supplemental lubricant reservoir 28 formed in the end cap 15. For each opening 31, 32 the bearing liner 18a is formed with a series of apertures 33 spaced apart along the liner. As before, the reservoir 28 in the end cap is filled with a lubricant such as grease which also fills the slot openings 31, 32. Grease can flow through the apertures in the bearing liner on to the axle rotating within the liner to provide a lubricant film between the axle and liner.

I claim:

1. A bearing assembly for supporting an axle for rotation comprising:
   a housing having a cylindrical bore, said housing having an opening at one end of the bore to receive an end journal of said axle;
   an end cap closing the other end of the bore and providing a lubricant reservoir within said housing bounded by said end cap;
   a cylindrical bearing liner seated in the bore for receiving said end journal of said axle;
   a plurality of slot openings in the bore of said housing extending along the length of said bore, each slot opening having an open end positioned adjacent said end cap, said open ends of said slot openings communicating directly with said lubricant reservoir, and being spaced circumferentially around said bore, at least one slot opening being disposed near a top portion of said cylindrical bore;
   a plurality of opening means in said bearing liner in register with said plurality of slot openings in said bore, each said plurality of opening means comprising a series of spaced apertures in said bearing liner, each said series being in communication with respective said slot openings in said bore to enable lubricant to pass directly from said lubricant reservoir, through said plurality of slot openings in said bore and respective opening means in said bearing liner to said end journal of said axle rotating within said bearing liner.

2. A bearing assembly according to claim 1, wherein said plurality of slot openings in the bore of said housing are spaced approximately 120 degrees around said bore of said housing.

3. A bearing assembly according to claim 1, wherein axially facing thrust washers are mounted on the housing for engaging axially facing thrust faces on the axle to limit axial movement of the axle with respect to the housing.

4. A bearing assembly according to claim 3, wherein the axially facing thrust faces on the axle are provided on a thrust collar secured to the end of the axle.

5. A bearing assembly according to claim 4, wherein said end cap at the closed end of the housing is detachably mounted and thrust washers mounted on the end cap and a part of the housing, respectively, engage on opposite sides of a thrust collar.

6. A bearing assembly according to claim 1, wherein a lubricant seal is mounted in the open end of the housing for sealing engagement with said axle projecting into the housing.

7. A bearing assembly for supporting an axle for rotation comprising:
   a housing having a cylindrical bore, said housing having an opening at one end of the bore to receive an end journal of said axle;
   an end cap closing the other end of the bore and providing a lubricant reservoir within said housing bounded by said end cap;
   a cylindrical bearing liner seated in the bore for receiving said end journal of said axle;
   a plurality of slot openings in the bore of said housing extending along the length of said bore, each slot opening having an open end positioned adjacent said end cap, said open ends of said slot openings communicating directly with said lubricant reservoir, said slot openings being spaced approximately 120 degrees around the circumference of said bore at least one slot opening being disposed near a top portion of said cylindrical bore;
   a plurality of opening means in said bearing liner in register with said plurality of slot openings in said bore, each said plurality of opening means comprising a series of spaced apertures in said bearing liner, each said series being in communication with respective said slot openings in said bore to enable lubricant to pass directly from said lubricant reservoir, through said plurality of slot openings in said bore and respective opening means in said bearing liner to said end journal of said axle rotating within said bearing liner.

* * * * *